(12) United States Patent
Deng et al.

(10) Patent No.: US 10,100,811 B2
(45) Date of Patent: Oct. 16, 2018

(54) NOISE CONTROL FOR A WIND TURBINE

(71) Applicant: SIEMENS AKTIENGESELLSCHAFT, München (DE)

(72) Inventors: Heng Deng, Ikast (DK); Nuno Miguel Amaral Freire, Brande (DK)

(73) Assignee: SIEMENS AKTIENGESELLSCHAFT (DE)

( * ) Notice: Subject to any disclaimer, the term of this patent is extended or adjusted under 35 U.S.C. 154(b) by 385 days.

(21) Appl. No.: 15/086,354

(22) Filed: Mar. 31, 2016

(65) Prior Publication Data

US 2016/0290320 A1 Oct. 6, 2016

(30) Foreign Application Priority Data

Apr. 2, 2015 (EP) .................................... 15162469

(51) Int. Cl.
| | |
|---|---|
| *F03D 7/02* | (2006.01) |
| *F03D 9/00* | (2016.01) |
| *H02P 6/18* | (2016.01) |
| *H02P 9/42* | (2006.01) |
| *H02P 21/22* | (2016.01) |

(Continued)

(52) U.S. Cl.
CPC ........... *F03D 7/0296* (2013.01); *F03D 9/255* (2017.02); *H02P 6/183* (2013.01); *H02P 9/42* (2013.01); *H02P 21/22* (2016.02); *H02P 29/50* (2016.02)

(58) Field of Classification Search
CPC ........ F03D 7/0296; F03D 9/003; F03D 9/255; H02P 6/183; H02P 9/42; H02P 21/22; H02P 29/50
See application file for complete search history.

(56) References Cited

U.S. PATENT DOCUMENTS

| | | | |
|---|---|---|---|
| 7,504,738 B2 * | 3/2009 | Barton .................. | F03D 7/0284 290/44 |
| 2006/0132993 A1 * | 6/2006 | Delmerico ............ | F03D 7/0284 361/20 |

(Continued)

FOREIGN PATENT DOCUMENTS

| | | |
|---|---|---|
| EP | 2043255 A2 | 4/2009 |
| EP | 2485388 A1 | 8/2012 |

(Continued)

OTHER PUBLICATIONS

W. Zhu et al.: "Investigation of Force Generation in a Permanent Magnet Synchronous Machine", IEEE Transactions on Energy Conversion, vol. 22, No. 3, pp. 557-565, Sep. 2007; 2007.

(Continued)

*Primary Examiner* — Igor Kershteyn
(74) *Attorney, Agent, or Firm* — Schmeiser Olsen & Watts LLP

(57) ABSTRACT

An arrangement for determining a d-component (Idref, I*d) of a reference current in a d-q coordinate system for reducing noise of a wind turbine, the arrangement including a noise/vibration determination module for determining noise/vibration components of oscillations of at least one wind turbine component, and a processing block for calculating a first type of the d-component of the reference current based on the noise/vibration component output by the noise/vibration determination module, is provided.

16 Claims, 4 Drawing Sheets

Figure 1:
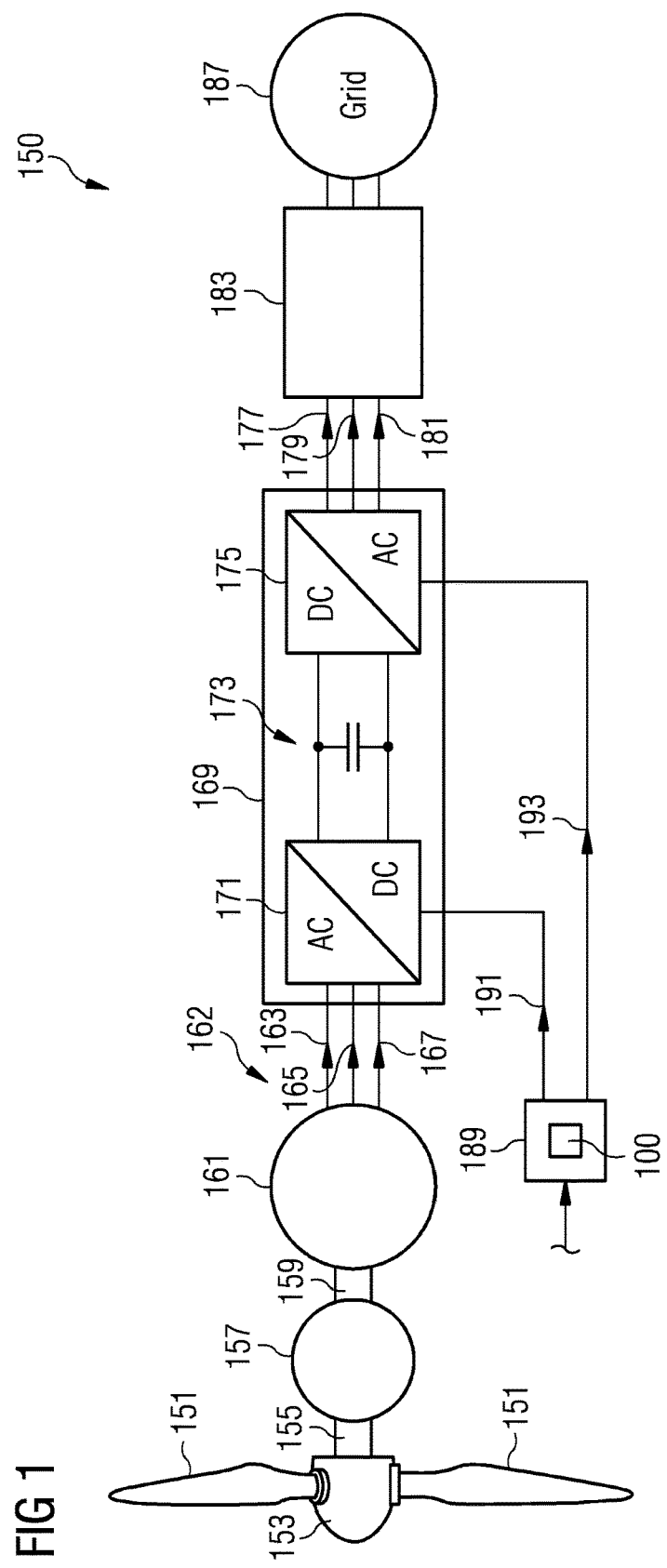

(51) Int. Cl.
    *H02P 29/50*     (2016.01)
    *F03D 9/25*     (2016.01)

(56) References Cited

U.S. PATENT DOCUMENTS

| | | | | |
|---|---|---|---|---|
| 2006/0214429 | A1* | 9/2006 | Kikuchi | F03D 7/0272 |
| | | | | 290/44 |
| 2007/0120369 | A1* | 5/2007 | Delmerico | F03D 7/0272 |
| | | | | 290/44 |
| 2007/0121353 | A1* | 5/2007 | Zhang | H02M 1/12 |
| | | | | 363/39 |
| 2007/0177314 | A1* | 8/2007 | Weng | H02P 9/007 |
| | | | | 361/20 |
| 2008/0001411 | A1* | 1/2008 | Ichinose | F03D 7/0224 |
| | | | | 290/55 |
| 2009/0085354 | A1* | 4/2009 | Tan | H02P 9/42 |
| | | | | 290/44 |
| 2011/0018281 | A1* | 1/2011 | Tan | H02P 9/42 |
| | | | | 290/55 |
| 2013/0009586 | A1 | 1/2013 | Chen | |
| 2014/0021894 | A1 | 1/2014 | Simili | |

FOREIGN PATENT DOCUMENTS

| | | | | |
|---|---|---|---|---|
| EP | 2552012 | A1 | 1/2013 | |
| EP | 3076542 | A1 * | 10/2016 | ........... F03D 7/0296 |
| JP | 2008000503 | A2 | 4/2009 | |
| JP | 2011176922 | A | 9/2011 | |

OTHER PUBLICATIONS

G. Jiao et al.: "Field Weakening for Radial Force Reduction in Brushless Permanent-Magnet DC Motors", IEEE Transactions on Magnetics, vol. 40, No. 5, pp. 3286-3292, Sep. 2004; 2004.

* cited by examiner

NOISE CONTROL FOR A WIND TURBINE

CROSS-REFERENCE TO RELATED APPLICATIONS

This application claims priority to European Application No. EP 15162469.9 having a filing date of Apr. 2, 2015, the entire contents of which are hereby incorporated by reference.

FIELD OF INVENTION

The following invention relates to an arrangement and a method for determining a d-component of a reference current, to a generator side controller for controlling a generator side frequency converter of a wind turbine (e.g. having a permanent magnet synchronous generator) and further to a wind turbine.

BACKGROUND

The document US 2014/0021894 A1 discloses a torque ripple reduction of multiple harmonic components, wherein a ripple reduction signal is generated in response to the torque command that simultaneously cancels a first and a second ripple harmonic in the torque signal.

EP 2 043 255 A2 discloses a system and method for controlling torque ripples in synchronous machines, wherein power and/or torque control signals are provided to the power converter to regulate the fundamental power and/or torque produced by the machine.

EP 2 485 388 A1 discloses a method for controlling the operation of an electromechanical transducer, wherein a harmonic control signal is determined being indicative for a harmonic operational behavior of the electromechanical transducer, wherein the harmonic operational behavior is given by electric and/or mechanical oscillations having frequency components being different from a fundamental frequency. Further, a modified drive signal based on the determined harmonic control signal is generated and supplied to electromagnetic coils of a stator of the electromechanical transducer.

Reduction of noise and vibration may be a common concern in high performance applications employing permanent magnet machines, namely wind turbines using high power permanent magnet synchronous generators in which spatial harmonics of inductance and magnet flux may lead to high torque ripple.

Conventionally, this problem may be approached in the machine design phase. However, due to manufacturing limitations, a noise/vibration-free machine may not be possible to be manufactured. Thus, control strategies and solutions are mandatory in order to comply with noise/vibration requirements.

In the aforementioned prior art documents, the manipulation of torque or $I_q$ command may commonly be used in a torque ripple control. However, those techniques may require a high bandwidth of the torque or current control system which may be difficult to be achieved in high power applications. Alternatively, voltage harmonics may be injected in a conventional system, directly into the command voltage for PWM modulation generation allowing for extended bandwidth.

It has been observed, that vibration and/or noise of an electrical or mechanical component of the wind turbine is not reduced in a sufficient manner or to a sufficient degree in conventional systems. Thus, there may be a need for an arrangement for appropriately controlling a wind turbine, such that noise/oscillations are effectively reduced during operation. Furthermore, in order to construct such a control arrangement, there may be a need for an arrangement for determining in particular a d-component of a reference current in a d-q coordinate system which may eventually be used within the control arrangement, in particular in a generator side controller for controlling a generator side frequency converter of a wind turbine.

SUMMARY

A feedback control method with respect to the d-component of the current is proposed according to embodiments of the present invention, allowing the drive to operate at reduced noise and vibration levels. Thereby, the arrangement and method may in particular be applicable to reduce noise and vibrations in permanent magnet synchronous generators by controlling the generator d-component of the current. Embodiments of the present invention may be applied or employed for wind turbine applications, but it may also be applied to other equipment with demanding noise/vibration requirements when employing permanent magnet synchronous machines.

The term noise/vibration in different contexts may represent or mean noise and/or vibration.

According to an embodiment of the present invention it is provided a noise control arrangement for determining a d-component of a reference current in a d-q coordinate system for reducing noise and/or vibration of a wind turbine, the arrangement comprising a noise/vibration determination module for determining noise/vibration components of oscillations of at least one wind turbine component, and a processing block for calculating a first type of the d-component of the reference current based on the noise/vibration component output by the noise/vibration determination module.

In particular, the processing block may comprise a noise/vibration processing module (such as e.g. performing signal processing) for obtaining an actual characteristic of at least one noise/vibration component of the determined noise/vibration components, a reference determination module (such as e.g. comprising or using a LUT) for providing a reference characteristic of the harmonic component, and a control module (e.g. a PI controller) for calculating a first type of the d-component of the reference current based on a difference between the actual characteristic and the reference characteristic of the noise/vibration component.

The arrangement may comprise hardware and/or software, in particular also including a (programmable) processor. A d-q coordinate system may be a system which rotates synchronously with the rotating rotor (or synchronously with an electrical rotation). The dqo transformation can be thought of in geometric terms as the projection of the three separate sinusoidal phase quantities onto two axes rotating with the same angular velocity as the sinusoidal phase quantities. The two axes are called the direct, or d, axis; and the quadrature or q, axis; that is, with the q-axis being at an angle of 90 degrees from the direct axis. The reference current may also comprise a q-component which may be determined by a conventional method.

The generator 3-phase currents (in the stationary abc reference frame) are transformed to the synchronous rotating dq0 reference frame by using the following transformation matrix:

$$\begin{bmatrix} x_d \\ x_q \\ x_0 \end{bmatrix} = \frac{2}{3} \begin{bmatrix} \cos(\theta) & \cos\left(\theta - \frac{2\pi}{3}\right) & \cos\left(\theta + \frac{2\pi}{3}\right) \\ -\sin(\theta) & -\sin\left(\theta - \frac{2\pi}{3}\right) & -\sin\left(\theta + \frac{2\pi}{3}\right) \\ 1/2 & 1/2 & 1/2 \end{bmatrix} \begin{bmatrix} x_a \\ x_b \\ x_c \end{bmatrix}$$

where θ is the rotor flux position. As a consequence, the d-axis is aligned with the rotor flux space vector, and Id allows for flux weakening. Iq may allow for torque control.

The d-component and the q-component of the reference current may then be supplied to a current controller which may derive therefrom reference voltages which in turn may be supplied to a modulator module which may generate pulse width modulation signals to be supplied to gates of power transistors comprised in the generator side converter of the wind turbine frequency converter.

The several modules (noise/vibration determination module, noise/vibration processing module, reference determination module, control module) of the arrangement may comprise hardware and/or software, in particular also including one or more processors and one or more electronic data storages.

The noise/vibration determination module may determine noise/vibration components of oscillations (electrical and/or mechanical oscillations) of at least one wind turbine component (for example mechanical component and/or electronic/electric/magnetic component, in particular the generator) in a number of ways. Thereby, electrical and/or mechanical signals may be measured, sensed or calculated. Noise of the wind turbine (or at least one wind turbine component) may be associated with noise/vibration components or frequency components that are undesired, e.g. certain harmonics multiples of the generator electrical frequency.

The noise/vibration processing module may process the noise/vibration components (for example represented by analog signals, such as sinusoidal wave traces, or digital data, such as amplitude and/or phase of the noise/vibration components). The characteristic of at least one noise/vibration component may for example comprise amplitude and/or phase of this particular vibration (or frequency) component. The noise/vibration processing module may also obtain the actual characteristics of several noise/vibration components of the determined noise/vibration components. The characteristic may also comprise a peak value of the corresponding noise/vibration component. The noise/vibration processing module may for example comprise a bandpass filter, a Fourier analysis module or a combination of the aforementioned functionalities.

The reference determination module may be used to provide, for a particular noise/vibration component, an expected reference characteristic and may for example involve simulations and/or offline testing.

The control module (in particular a PI-Controller or a resonant controller (A resonant controller is a common alternative to a PI controllers when reference signals are sinusoidal signals instead of DC signals) may eventually calculate the first type of the d-component of the reference current such that the difference between the actual characteristic and the reference characteristic of the noise/vibration component ideally vanishes. Different types of controllers may be employed for the control module, e.g. sliding mode controller or the like.

Thereby, according to embodiments of the present invention, a feedback control method and feedback control arrangement of $I_d$ (i.e. the d-component of the current to be output by the generator of the wind turbine) is proposed which may allow operating at reduced noise and vibration levels. Thus, application of the arrangement or the corresponding method may lead to attenuation or noise/vibration components which are not desired, in particular noise/vibration components having a frequency being equal to 6 times or to 12 times an electrical frequency.

According to an embodiment of the present invention, the noise/vibration determination module comprises a sensor for sensing noise and/or vibration, in particular microphone and/or acceleration sensor, for measuring the noise/vibration components of oscillations of the at least one wind turbine component.

The sensor may for example comprise an acoustic sensor, or an acceleration sensor, in particular installed at plural locations of the wind turbine or in particular installed at a nacelle of the wind turbine. Thereby, a reliable determination of the noise/vibration components of the oscillations may be provided.

According to an embodiment of the present invention, the noise/vibration determination module comprises an estimation module for estimating the noise/vibration components of oscillations of the at least one wind turbine component based on current, voltage output by a generator of the wind turbine and based on rotational frequency and angular position of a rotor of the generator.

The estimation module may comprise an arithmetic/logic processor. The inputs of the estimation module may comprise electrical quantities of voltage and/or current output by the generator. Thereby, one or more sensors may be dispensed with.

Furthermore, the arrangement may comprise a switch to selectively (alternatively) supplying the noise/vibration components of oscillations of the at least one wind turbine component as measured by the sensor or as estimated by the estimation module to the noise/vibration processing module. Thereby, a high flexibility may be provided. For example, the estimation of the noise/vibration component may be relatively reliable, in particular operational ranges, but may not have sufficient accuracy in other operational ranges. For those latter mentioned operational ranges, the noise/vibration components may be measured using the sensor and vice versa.

According to an embodiment of the present invention, the reference determination module is adapted to calculate the reference characteristic of the noise/vibration component based on a simulation or off-line test using a rotational frequency and a torque of the generator as input.

A reference value or reference values may be essentially zero. However, in other situations, also an ideally operating wind turbine may generate unavoidable frequency components or noise/vibration components. Thus, a simulation (in particular involving a physical/mechanical model of the wind turbine) may be required to obtain the reference characteristic of the one or more noise/vibration components.

Furthermore, the reference determination module may comprise a look up table (LUT) which may comprise information for different working points (such as rotor frequency, torque and/or generator power). Thereby, the calculation of the reference characteristic may be achieved in a simple and fast manner without requiring extensive equipment.

According to an embodiment of the present invention, the noise/vibration processing module outputs an amplitude and/or phase of the noise/vibration component, in particular being associated with 6 times or 12 times an electrical frequency, as the actual characteristic, and the reference determination module outputs a reference amplitude and/or phase of the noise/vibration component, in particular being associated with 6 times or 12 times an electrical frequency, as the reference characteristic.

By using the amplitude and/or phase as the characteristic, a very compact representation is achieved.

According to an embodiment of the present invention, the noise/vibration processing module outputs a wave form signal of the noise/vibration component, in particular being associated with 6 times or 12 times an electrical frequency, as the actual characteristic and the reference determination module outputs a reference wave form signal of the noise/vibration component, in particular being associated with 6 times or 12 times an electrical frequency, as the reference characteristic.

The wave form may be output in an analog or a digital format. The wave form may comprise the amplitude as well as the phase of the noise/vibration component. The wave form may be a sinusoidal wave form.

According to an embodiment of the present invention, the arrangement further comprises a subtraction element for calculating the difference between the actual characteristic and the reference characteristic of the noise/vibration component being arranged to supply the difference to the control module. Thereby, a conventional element may be employed.

According to an embodiment of the present invention, the arrangement further comprises an MTPA module adapted to apply a maximum torque per ampere algorithm for calculating a second type of the d-component of the reference current in a d-q coordinate system for minimizing generator total current.

The maximum torque per Ampere algorithm may be a conventional algorithm known to the skilled person. Thereby, a second type of the d-component of the reference current is obtained.

Thereby, further flexibility for choosing either the first type or the second type of the d-component (or a combination or derived quantity thereof) of the reference current is provided.

According to an embodiment of the present invention, the arrangement further comprises a voltage control module adapted to calculate, for flux weakening under high speed operation, a third type of the d-component of the reference current in a d-q coordinate system for avoiding converter overmodulation.

The voltage control module may be a conventional module known to the skilled person. It may be adapted to weaken the flux under a high speed operation, i.e. when the rotational speed of the rotor supersedes a particular threshold. Thereby, a further flexibility is provided to select the first, the second or the third type of the d-component of the reference current or to obtain a combination, such as an average of the first, the second and/or the third type of the d-component of the reference current, to be used in further downstream control equipment.

According to an embodiment of the present invention, the arrangement further comprises a selection module for selecting the first type, the second type or the third type of the d-component of the reference current as the d-component of the reference current, wherein in particular the minimum is selected.

When the minimum is selected, an overmodulation may be avoided such that in particular the output voltage may be kept within acceptable limits. Furthermore, the selection may be simplified.

According to an embodiment of the present invention it is provided a generator side controller for controlling a generator side frequency converter of a wind turbine, the generator side controller comprising an arrangement for determining a d-component of a reference current according to one of the preceding embodiments, an (conventional) arrangement for determining a q-component of a reference current, a current controller for determining a d-component and a q-component of a desired voltage at the generator output, a modulator to generate pulse width modulation signals for the generator side frequency converter based on the d-component and the q-component of the desired voltage.

The frequency converter may comprise both a generator side controller and a grid side controller. The generator side controller may substantially be or comprise an AC-DC converter, while the grid side controller may substantially comprise or be a DC-AC converter for converting a direct current power signal or power stream to a fixed frequency power stream.

The generator side frequency converter may comprise several power transistors, such as IGBTs. In particular, three phases may be supported. The arrangement for determining a d-component of a reference current may also be referred to as Id reference calculation module and the arrangement for determining a q-component of a reference current may also be referred to as Iq reference calculation module.

Thereby, the $I_d$ reference calculation module may receive an input power and/or torque (generated by the generator) and/or a modulation index (depth of the pulse width modulation) and also the voltage at the output of the generator.

The $I_q$ reference calculation module may receive as input a reference of a power and/or a reference of a torque, the voltage at the output of the generator, the voltage at a DC-link (between the generator side controller portion and the grid side controller portion), a rotational frequency (electrical or mechanical) of the generator or the rotor, and a power and/or a torque of the generator.

The current controller may receive, besides the Id and Iq references from the $I_d$ reference calculation module and the $I_q$ reference calculation module, as its input three phase components of the generator current (of coils of the generator), an angular position of the generator and the rotational speed of the generator.

Furthermore, the generator side controller may comprise a transformation module which transforms from a d-q coordinate system to an a-b-c coordinate system corresponding to three electrical phases. The modulator may receive as an input, besides the voltages for the three phases, the voltage at a DC link.

The converter may be connected with the generator.

Thereby, an effective control of a wind turbine with respect to noise reduction may be achieved.

According to an embodiment of the present invention, it is provided a wind turbine which comprises a generator, a generator side frequency converter (furthermore also in particular a DC-link and a grid side frequency converter), and a generator side controller according to one of the embodiments as described above which is coupled to control the generator side frequency converter.

It should be understood that features which have been individually or in any combination disclosed, described, provided or applied to an arrangement for determining a d-component of a reference current may also be applied to a method for determining a d-component of a reference current according to an embodiment of the present invention and vice versa.

According to an embodiment of the present invention it is provided a method for determining a d-component of a reference current in a d-q coordinate system for reducing noise of a wind turbine, the method comprising determining noise/vibration components of oscillations of at least one wind turbine component, obtaining an actual characteristic of at least one noise/vibration component of the determined noise/vibration components, providing a reference characteristic of the noise/vibration component, and calculating a first type of the d-component of the reference current based on a difference between the actual characteristic and the reference characteristic of the noise/vibration component.

The method may partly be implemented in hardware and/or software.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION

Figure 2:
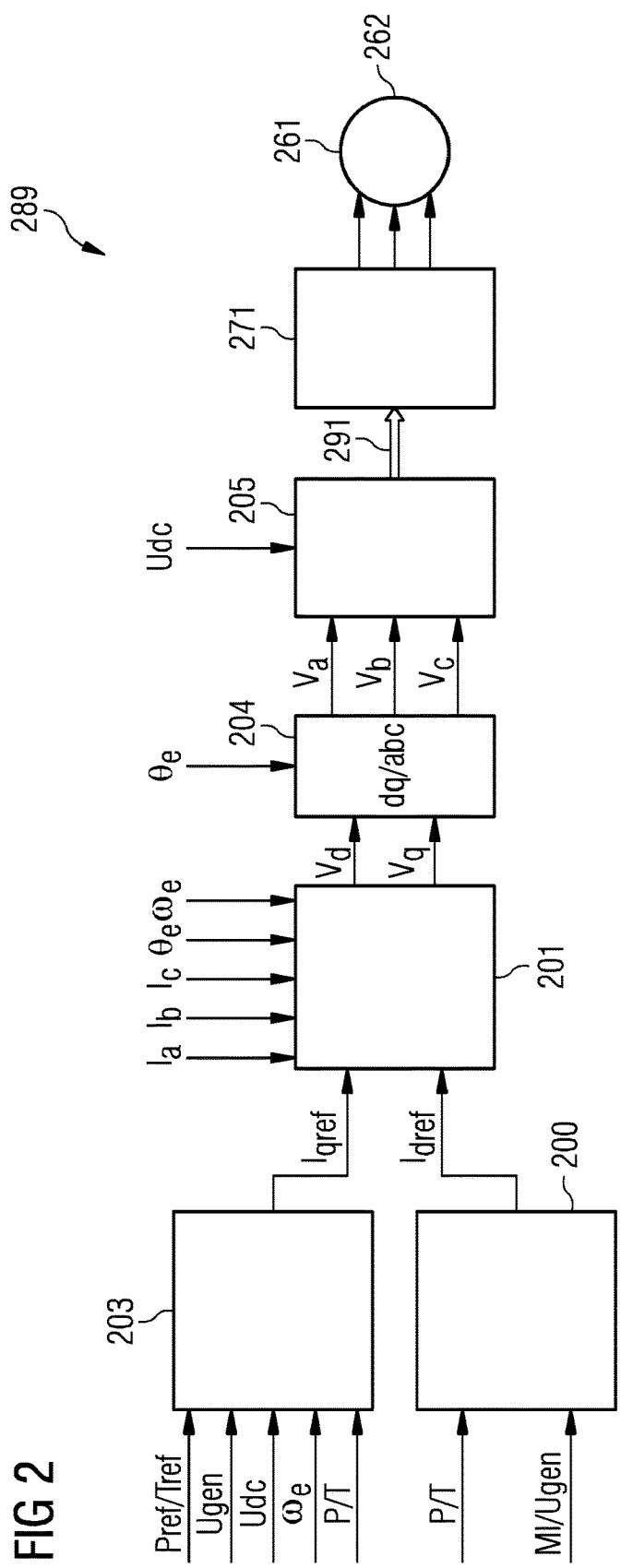
Figure 3:
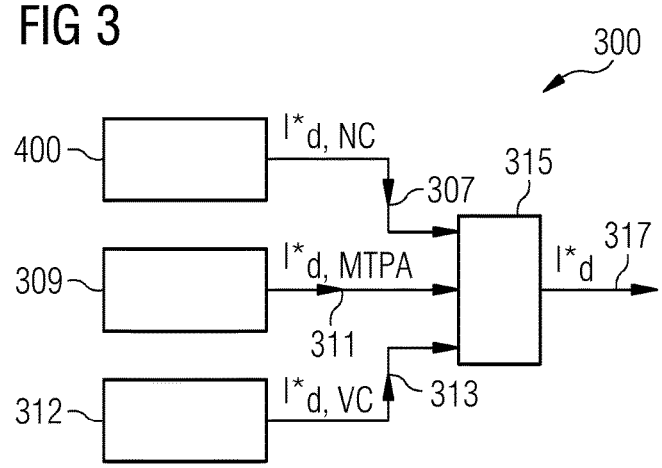
Figure 4:
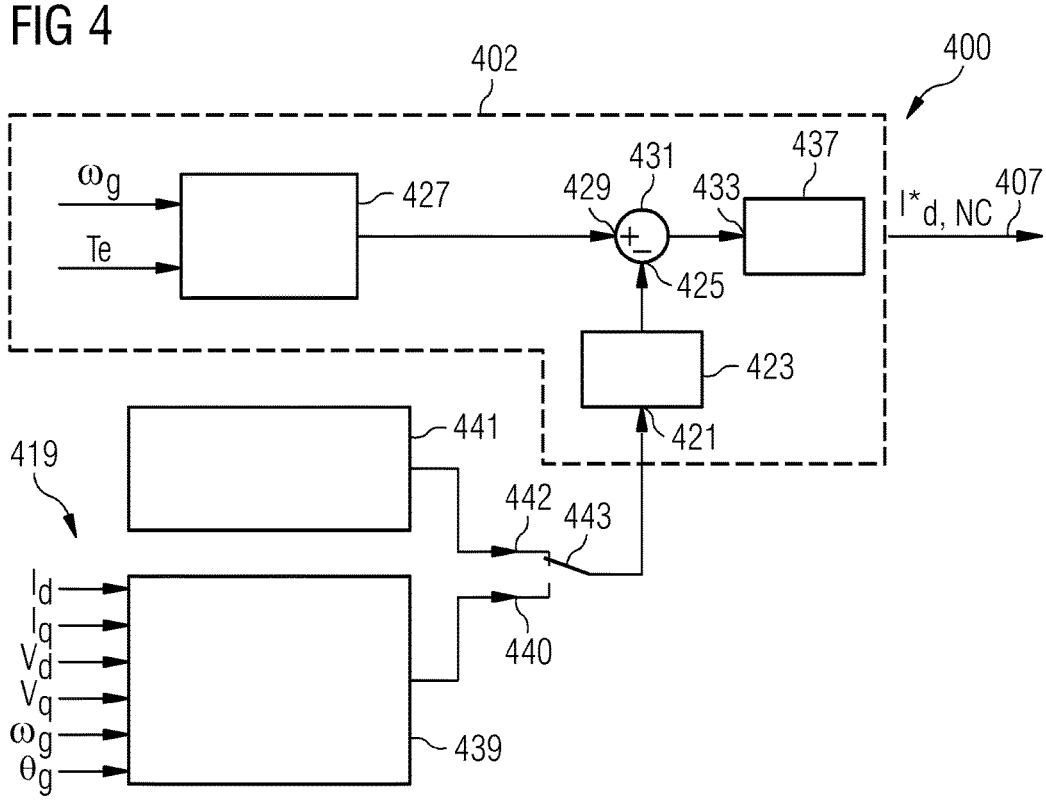
Figure 5:
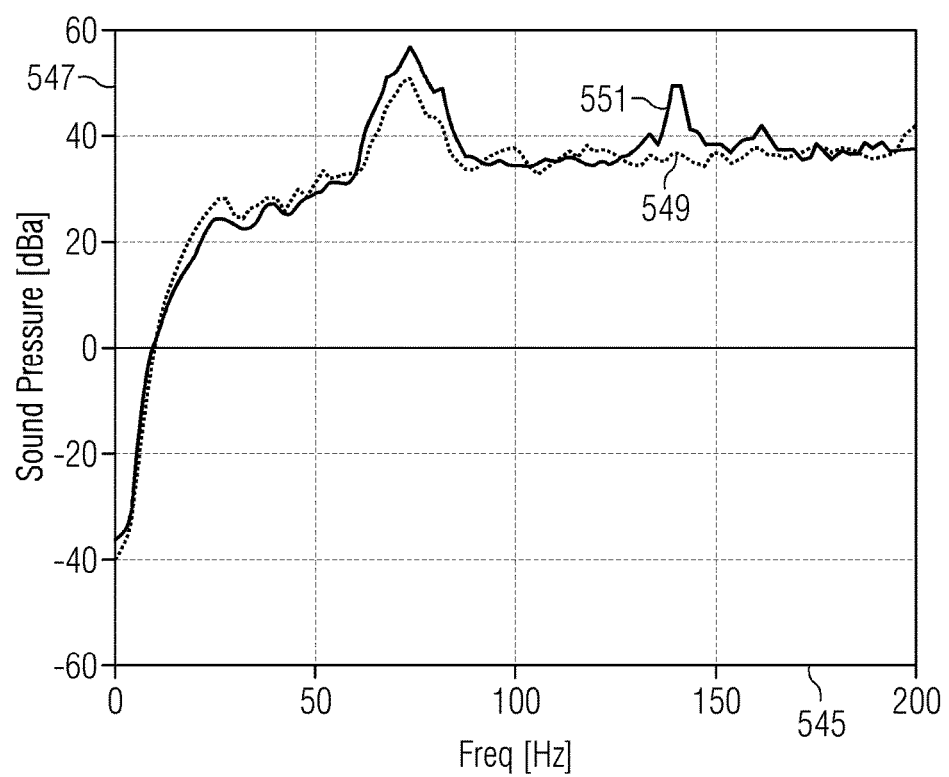

Some of the embodiments will be described in detail, with reference to the following figures, wherein like designations denote like members, wherein:

FIG. 1 schematically illustrates a wind turbine according to an embodiment of the present invention comprising an arrangement for determining a d-component of a reference current;

FIG. 2 schematically illustrates a block diagram of a control method comprising a method for determining a d-component of a reference current according to an embodiment of the present invention;

FIG. 3 schematically illustrates a block diagram of a method for determining a d-component of a reference current according to an embodiment of the present invention;

FIG. 4 schematically illustrates a block diagram of a method for determining a d-component of a reference current according to an embodiment of the present invention; and FIG. 5 illustrates noise measurements for illustrating effects of methods and arrangements according to embodiments of the present invention.

DETAILED DESCRIPTION

The illustration in the drawings is in schematic form. It is noted that in different figures, similar or identical elements are provided with the same reference signs or with reference signs, which are different from the corresponding reference signs only within the first digit.

It should be understood that features in the different figures are labeled with reference signs which differ only in the first digit, if these features share similarities in structure and/or function. Thus, a description of a feature not explicitly explained in a particular embodiment or figure may be taken from the description of the corresponding feature in another embodiment or figure.

FIG. 1 schematically illustrates a wind turbine 150 according to an embodiment of the present invention comprising an arrangement 100 for determining a d-component of a reference current according to an embodiment of the present invention.

The wind turbine 150 includes rotor blades 151 which are connected via a hub 153 to a primary rotor shaft 155 which rotates when wind impacts on the rotor blades 151. An optionally gearbox 157 is coupled to the primary shaft 155 and transforms the rotation of the primary shaft 155 to a secondary shaft 159 which rotates within the generator 161. In other embodiments, the gearbox 157 can be dispensed with so that the wind turbine 150 may be configured as a direct drive wind turbine.

The generator 161 comprises not illustrated coils wound around stator cores and further comprises a rotor comprising plural magnets, for example permanent magnets that rotate relative to the stator. Upon rotation of the secondary shaft 159 having the permanent magnets attached thereto, the coils of the generator 161 generate currents by induction which are output in three phases 163, 165, 167. In other embodiments, more or less than three phases may be output by the generator 161. Thereby, an energy stream is provided to the AC-DC-AC converter 169.

Thereby, the converter 169 comprises a generator side frequency converter 171, a DC-link 173 coupled at an output of the generator side frequency converter 171 and a grid side frequency converter 175 that is coupled to the DC-link 173. The generator side frequency converter 171 generates or converts the variable frequency alternating current power stream received from the generator 161 to a substantially direct current power stream at the DC-link 173, while the grid side frequency converter 175 converts the direct current power stream to a fixed frequency power stream which is output in three phases 177, 179, 181.

The output power stream is transformed by the transformer 183 to a medium voltage or optionally by one or more additional transformers, in particular wind park transformers, in order to be supplied to a utility grid 187.

In order to form a power stream at the output 177, 179, 181, the wind turbine converter 169 is controlled by the controller 189 which provides pulse width modulation signals 191 to the generator side frequency converter 171 and which may optionally also provide pulse width modulation signals 193 to the grid side frequency converter 175.

Thereby, the converter controller 189 comprises an arrangement 100 for determining a d-component of a reference current in a d-q coordinate system according to an embodiment of the present invention.

FIG. 2 schematically illustrates a converter controller 289 according to an embodiment of the present invention as controlling a converter which is connected to the generator 261. The generator side frequency converter 271 is controlled by the pulse width modulation signals 291 which are output by the generator side controller 289.

Thereby, the generator side controller 289 comprises an arrangement 200 for determining a d-component of a reference current according to an embodiment of the present invention. In particular, the arrangement 200 receives as an input power P and/or torque T and further receives as an input a modulation index MI and/or a voltage $U_{gen}$ at the output 262 of the generator 161. According to a method for determining a d-component of a reference current according to an embodiment of the present invention, the arrangement 200 determines the d-component of the reference current $I_{dref}$ and provides it to a current controller 201.

Thereby, the current controller also receives a q-component of a reference current $I_{qref}$ which is output by an $I_q$ reference calculation block 203. Thereby, the $I_q$ reference calculation block 203 receives as an input a reference of a power and/or torque $P_{ref}/T_{ref}$, a generator voltage $U_{gen}$, a DC-link voltage $U_{dc}$, an electrical rotational frequency $\omega_e$ and power and/or torque P/T.

The current controller 201 further receives the three phase currents $I_a$, $I_b$, $I_c$ of the coils of the generator 261, the rotational position $\theta_e$ of the generator and the rotational frequency (electrical or mechanical) $\omega_c$ of the generator 261 or the primary shaft 155 or the secondary shaft 159. The current controller 201 outputs a d-component of a voltage ($V_d$) and a q-component of a voltage ($V_q$) and provides it to a transformation module 204 which transforms the voltages in the d-q coordinate system to voltages of a three phase coordinate system.

The thereby formed three phase voltages $V_a$, $V_b$, $V_c$ are provided to a modulator unit 205 which further receives the DC-link voltage $U_{dc}$ and generates pulse width modulation signals 291 based on the received voltages and provides these pulse width modulation signals 291 to the generator side frequency converter 271.

The current controller 201 in FIG. 2 may perform a closed-loop regulation of generator currents in the d-q frame with measured 3-phase current as a feedback source. The output of the current controller 201 is used by the modulator module 205 for generating PWM (pulse width modulation) signals 291. The PWM signals 291 are used to control power electronic switches (such as IGBTs) in the generator side converter 271.

The arrangement 200 for determining a d-component of a reference current may be configured in different manners.

One example of the arrangement 200 illustrated in FIG. 2 is illustrated in FIG. 3 as an arrangement 300 for determining a d-component of a reference current. Thereby, the arrangement 300 comprises an arrangement 400 for determining a d-component of a reference current which is also illustrated in FIG. 4 and will be described in detail below.

The arrangement 300 comprises the arrangement 400 which outputs a first type 307 ($I^*_{d, NC}$) of the d-component of the reference current. The arrangement 300 further comprises a maximum torque per Ampere (MTPA) module 309 which calculates and outputs a second type 311 ($I^*_{d, MTPA}$) of the d-component of the reference curve. The arrangement 300 further comprises a voltage control module 311 which outputs a third type 313 ($I^*_{d, VC}$) of the d-component of the reference current.

From the first type 307, the second type 311 and the third type 313 of the d-component of the reference current, a processing or selection module 315 determines the minimum or a particular combination or a derived quantity, such as an average, from the first type, the second type and the third type 307, 311, 313 of the d-component of the reference current and outputs the final reference of the d-component of the reference current 317 ($I^*_d$).

The d-component of the reference current $I_{dref}$ in FIG. 2 or the quantity $I^*_d$ (317) in FIG. 3 is the generator current reference in the d-q rotating frame which rotates synchronously with the primary or secondary shaft 155, 159 or with the electrical rotation.

There may be a number of methods that can be used as the arrangement 200 for determining the d-component of the reference current. For example, for generating the $I_d$ reference current, the state-of-the-art solution MTPA, as implemented in the module 309 illustrated in FIG. 3 may be used. Thereby, the current or generator voltage controller for flux weakening may be implemented.

The arrangement 400 (also referred to as noise control module) generates the $I_d$ current command 307 that can reduce noise and vibration of the wind turbine 150. There are other $I_d$ commands generated according to another target, such as MTPA or voltage controller (flux weakening controller). A deterministic logic 315 is then used (represented as the processing or selection module 315) to decide or to derive the final $I_d$ current command 317 according to the generator voltage and the inputs of the three different sources. One possible deterministic logic may be to find or select the minimum value of the different types 307, 311, 313 of the d-component as determined by the modules 400, 309 and 312. In other embodiments, another logic may be implemented in the module 315.

The arrangement 400 illustrated in FIG. 3 may be implemented or constructed in a number of ways. One possible solution is shown in FIG. 4. FIG. 4 schematically illustrates a block diagram of the arrangement 400 for determining a d-component of a reference current as may be used in the arrangement 300 illustrated in FIG. 3.

The arrangement 400 thereby comprises a noise/vibration determination module 419 for determining noise/vibration components 421 of oscillations of at least one wind turbine component. Thereby, the oscillations may comprise mechanical and/or electrical oscillations.

The arrangement 400 further comprises a processing block (402) for calculating a first type (407) of the d-component of the reference current based on the noise/vibration component (421) output by the noise/vibration determination module (419).

The processing block (402) may be configured in a number of ways.

In one embodiment, as illustrated in FIG. 4, the processing block (402) comprises a noise/vibration processing module 423 for obtaining an actual characteristic 425 of the at least one noise/vibration component of the determined noise/vibration components 421. The characteristic may for example include an amplitude and/or phase of the at least one noise/vibration component or it may include an analog (or digitally encoded) sinusoidal signal representative of the at least one noise/vibration component. Furthermore, a number of different noise/vibration components (differing in the frequency) may also be processed by the noise/vibration processing module 423 to obtain an actual characteristic of plural noise/vibration components.

The arrangement 400 or the processing block (402) further comprises a reference determination module 427 for providing a reference characteristic 429 of the at least one noise/vibration component or the several noise/vibration components. The characteristics 429, 425 output by the reference determination module 427 and the noise/vibration processing module 423 are of the same type.

The arrangement 400 or the processing block (402) further comprises a subtraction element 431 which determines the difference 433 between the reference characteristic 429 of the noise/vibration component and the actual characteristic 425 of the noise/vibration component and which provides the difference 433 to the control module 437 which outputs a first type 407 of the d-component of the reference current ($I^*_{d,\,NC}$), as is also depicted in FIG. 3 and labeled there with reference sign 307.

The noise/vibration determination module 419 comprises an estimation module 439 for estimating the noise/vibration component of oscillations of the at least one wind turbine component based on current $I_d$, $I_q$, voltage $V_d$, $V_q$ output by the generator 161, 261 and based on rotational frequency $\omega_g$ and angular position $\theta_d$ of the rotor 155 or 159 of the generator 161, 261. The estimation module 439 outputs the estimated noise/vibration components 440. Thereby, a sensorless methodology may be employed in the arrangement and method.

Furthermore, the noise/vibration determination module 419 comprises a sensor module 441 for sensing noise and/or vibration for measuring the noise/vibration component of oscillations of the at least one wind turbine component and outputting measured noise/vibration components 442.

The arrangement 400 or the processing block (402) further comprises a switch 443 that is arranged and connected to selectively supply the noise/vibration components of the oscillations of the at least one wind turbine component as measured by the sensor module 441 or as estimated by the estimation module 439 to the noise/vibration processing module 423.

The reference determination module 427 may for example comprise a look up table comprising information for different working points of the wind turbine or in particular the generator 161, 261.

The feedback noise/vibration 442, 440 may have a lot of harmonics. The noise/vibration processing module 423 may for example comprise a bandpass filter that may attenuate all frequencies not interested in to be attenuated. Only the harmonic component of an interesting frequency (desired to be damped) may pass the bandpass filter. Thereby, the typical interesting frequency may be 6 times the electrical frequency and/or 12 times the electrical frequency of the generator 161, 262. Thereby, electrical frequency is the frequency of the generator phase current. The command of noise and vibration at different load points may be saved within the look up table within the reference determination module 427. The command and processed feedback signal 425 may be used to calculate a regulation error 433. The control module 437 may for example be configured as a PI controller (proportional integral controller) which is used to generate the $I_d$ current command 407.

The feedback source, in particular the noise/vibration component 442 output by the sensor module 441 may be measured using a microphone and/or an accelerometer in the sensor-based option. The estimation module 439 may for example be configured as a torque ripple and radial force observer in the sensorless option. According to the chosen feedback source (either 442 or 440), a suitable signal processing algorithm may be required in the noise/vibration processing module 423. Therefore, the resultant error 433 may be input to the proportional-integral (PI) controller which generates a reference for $I_d$ in order to reduce noise/vibrations. Finally, $I^*_{d,\,NC}$ may be supplied to the current controller 201 (see FIG. 2) responsible for generating command voltages for a voltage modulator. Embodiments of the present invention may be integrated in a conventional vector controlled drive or other alternatives.

In a vector controlled permanent magnet generator drive, the $I_d$ reference may be generated by a maximum torque per Ampere (MTPA) algorithm and/or a voltage controller for flux weakening control under high-speed operation. When adding a noise/vibration controller, three distinct reference values for $I_d$ may be required to be managed, i.e. the reference values 307, 311 and 313, as is illustrated in FIG. 3. A selection may be performed by choosing the lowest one. Alternatively, a higher priority might be attributed to either noise control or MTPA, according to the application needs.

FIG. 5 illustrates a graph including curves, wherein an abscissa 545 indicates a frequency in Hertz and an ordinate 547 designates a sound pressure in dBa. The curve 549 illustrates the case $I_d=-800$ A and the curve 551 illustrates the situation for $I_d=0$ A. The wind turbine runs at 13 RPM and outputs a power of 2800 kW.

As can be seen, embodiments of the present invention provide a reduction of 6 dBa in 6f (6 times the generator electrical frequency) tonality by changing $I_d$ from 0 A to $-800$ A. Reduction of the 12f tonality is also visible in FIG. 5. The 6f tonality here corresponds to $6 \times n \times p/60$ Hz=70.2 Hz, where n represents generator mechanical rotational speed in revolutions per minute (rpm) and p represents the number of generator pole pairs, as an example n=13 rpm and p=54. In accordance with embodiments of the invention, the $I_d$ reference may be determined automatically, according to noise/vibration requirements. Embodiments of the present invention may provide for a solution for automatic noise/vibration control in a permanent magnet generator drive. Embodiments further may provide for reduced acoustic noise and vibration in a permanent magnet generator drive. Furthermore, two alternative feedback sources for the described control apparatus are possible.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. An arrangement for determining a d-component (Idref, I*d) of a reference current in a d-q coordinate system for reducing noise/vibration of a wind turbine, the arrangement comprising:
   a noise/vibration determination module for determining at least one noise/vibration component of oscillations of at least one wind turbine component; and
   a processing block for calculating a first type of the d-component of the reference current based on the at least one noise/vibration component output by the noise/vibration determination module.

2. The arrangement according to claim 1, wherein the processing block comprises:
   a noise/vibration processing module for obtaining an actual characteristic of at least one noise/vibration component of the determined at least one noise/vibration component;
   a reference determination module for providing a reference characteristic of the noise/vibration component; and
   a control module for calculating the first type of the d-component of the reference current based on a difference between the actual characteristic and the reference characteristic of the noise/vibration component.

3. The arrangement according to claim 1, wherein the noise/vibration determination module comprises:
   a sensor module for sensing noise and/or vibration for measuring the noise/vibration components of oscillations of the at least one wind turbine component.

4. The arrangement according claim 1, wherein the noise/vibration determination module comprises:
   an estimation module for estimating the noise/vibration components of oscillations of the at least one wind turbine component based on current (Id, Iq), voltage (Vd, Vq) output by a generator of the wind turbine and based on rotational frequency (ωg) and angular position (θg) of a rotor of the generator.

5. The arrangement according to claim 3, wherein the noise/vibration determination module comprises:
a switch to selectively alternatively supply the noise/vibration components of oscillations of the at least one wind turbine component as measured by the sensor or as estimated by the estimation module to the noise/vibration processing module.

6. The arrangement according to claim 1, wherein the reference determination module is configured to calculate a reference characteristic of the noise/vibration component based on a simulation or off-line test using a rotational frequency (ωg) and a torque (Te) of a generator as input,
wherein the reference determination module comprises a look up table comprising information for different working points.

7. The arrangement according to claim 1, wherein
the noise/vibration processing module outputs an amplitude and/or phase of the noise/vibration component being associated with 6 times or 12 times an electrical frequency as the actual characteristic and
the reference determination module outputs a reference amplitude and/or phase of the noise/vibration component being associated with 6 times or 12 times an electrical frequency as the reference characteristic.

8. The arrangement according to claim 1, wherein
the noise/vibration processing module outputs a wave form signal of the noise/vibration component being associated with 6 times or 12 times an electrical frequency as the actual characteristic and
the reference determination module outputs a reference wave form signal of the noise/vibration component being associated with 6 times or 12 times an electrical frequency as the reference characteristic.

9. The arrangement according to claim 1, further comprising:
a subtraction element for calculating a difference between the actual characteristic and the reference characteristic of the noise/vibration component being arranged to supply the difference to a control module.

10. The arrangement according to claim 1, further comprising:
a MTPA module configured to apply a maximum torque per ampere algorithm for calculating a second type of the d-component of the reference current in a d-q coordinate system for minimizing generator total current.

11. The arrangement according to claim 1, further comprising:
a voltage control module configured to calculate, for flux weakening under high speed operation, a third type of the d-component of the reference current in a d-q coordinate system for avoiding converter overmodulation.

12. The arrangement according to claim 11, further comprising:
a selection module for selecting the first type, the second type or the third type of the d-component of the reference current as the d-component of the reference current, wherein in particular the minimum is selected.

13. A generator side controller for controlling a generator side frequency converter of a wind turbine, the generator side controller comprising:
an arrangement for determining a d-component of a reference current according to claim 1;
an arrangement for determining a q-component of a reference current;
a current controller for determining a d-component and a q-component of a desired voltage at the generator output; and
a modulator to generate pulse width modulation signals, for the generator side frequency converter, based on the d-component and the q-component of the desired voltage.

14. A wind turbine, comprising:
a generator;
a generator side frequency converter; and
a generator side controller according to claim 13, coupled to control the generator side frequency converter.

15. A method for determining a d-component of a reference current in a d-q coordinate system for reducing noise of a wind turbine, the method comprising:
determining at least one noise/vibration component of oscillations of at least one wind turbine component; and
calculating a first type of the d-component of the reference current based on the noise/vibration component output by the noise/vibration determination module, the calculating comprising:
obtaining an actual characteristic of at least one noise/vibration component of the determined noise/vibration component;
providing a reference characteristic of the noise/vibration component; and
calculating the first type of the d-component of the reference current based on a difference between the actual characteristic and the reference characteristic of the noise/vibration component.

16. The arrangement according to claim 3, wherein the sensor module is at least one of a microphone and acceleration sensor.

* * * * *